United States Patent [19]

Harada et al.

[11] Patent Number: 5,615,030
[45] Date of Patent: Mar. 25, 1997

[54] BLACK MATRIX SUBSTRATE, AND COLOR FILTER AND LIQUID CRYSTAL DISPLAY DEVICE USING THE SAME

[75] Inventors: Ryutaro Harada; Satoshi Mitamura, both of Tokyo-to, Japan

[73] Assignee: Dai Nippon Printing Co., Ltd., Japan

[21] Appl. No.: 571,554

[22] Filed: Dec. 13, 1995

Related U.S. Application Data

[62] Division of Ser. No. 203,569, Mar. 1, 1994, Pat. No. 5,501,900.

[30] Foreign Application Priority Data

| Mar. 3, 1993 | [JP] | Japan | 5-042663 |
| Mar. 8, 1993 | [JP] | Japan | 5-075178 |

[51] Int. Cl.⁶ ............................................. G02F 1/1335
[52] U.S. Cl. ...................................... 349/110; 430/7
[58] Field of Search .......................... 359/67, 68, 591; 430/7

[56] References Cited

U.S. PATENT DOCUMENTS

| 4,157,215 | 6/1979 | Hanak | 354/1 |
| 5,201,268 | 4/1993 | Yamamoto et al. | 101/170 |
| 5,240,797 | 8/1993 | Matsushima et al. | 430/7 |
| 5,242,558 | 9/1993 | Matsushima et al. | 240/181.1 |
| 5,248,576 | 9/1993 | Yokoyama et al. | 430/7 |
| 5,395,678 | 3/1995 | Matsushima et al. | 359/891 |
| 5,512,215 | 6/1996 | Tachizono et al. | 252/584 |

FOREIGN PATENT DOCUMENTS

| 0546198 | 6/1993 | European Pat. Off. |
| 4-342204 | 11/1992 | Japan |

OTHER PUBLICATIONS

Coombs, Clyde; Printed Circuits Handbook 3rd Edition, pp. 12.1, 12.8, 12.13.

*Primary Examiner*—William L. Sikes
*Assistant Examiner*—James A. Dudek
*Attorney, Agent, or Firm*—Parkhurst, Wendel & Burr, L.L.P.

[57] ABSTRACT

A black matrix substrate is provided with a substrate, and a black pattern formed on the substrate. The black pattern includes at least metal particles in a resin pattern, which comprises resin formed in a pattern shape. The metal particles have such a particle diameter distribution that particles having particle diameters in a range of 5 nm to 50 nm are not less than 80% of the total particles. A projected area density at a conversion of 600 Å thickness of the metal particles in the black pattern, is not less than 60% An optical density of the black matrix substrate is not less than 1.5. A color filter, which has a high contrast ratio, can be constructed by use of this black matrix substrate. Further, a liquid crystal display device, which has a good image quality, can be constructed by use of this color filter.

14 Claims, 11 Drawing Sheets

FIG. 3
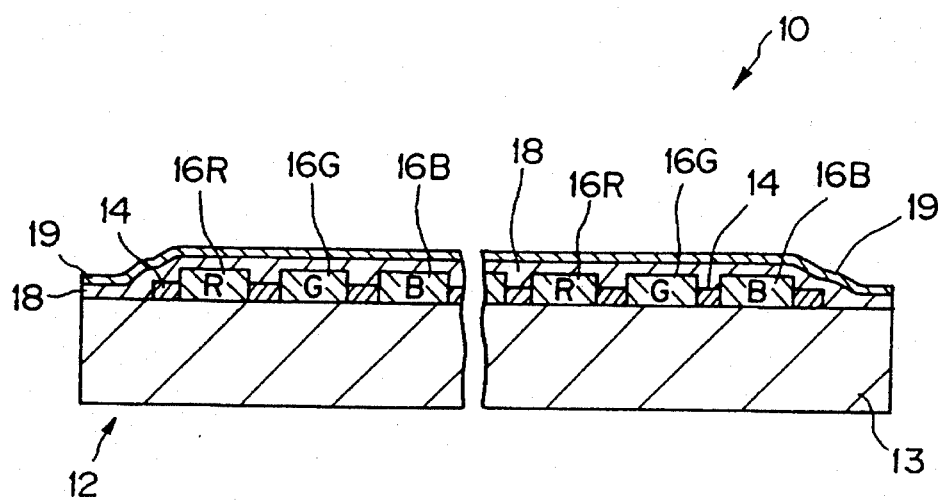
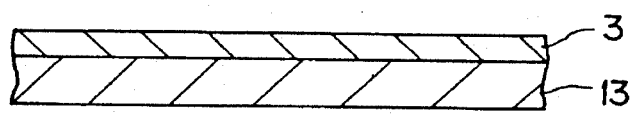
FIG. 4A
FIG. 4B
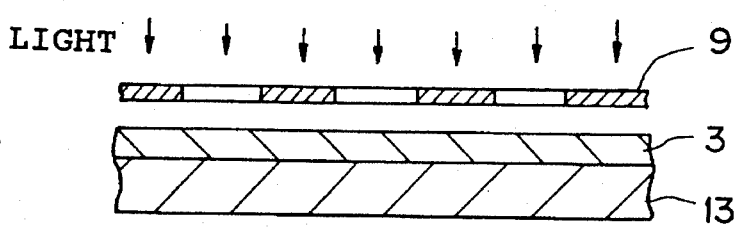
FIG. 4C
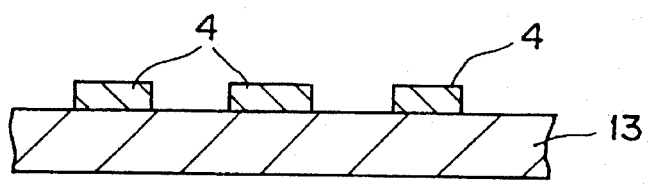
FIG. 4D
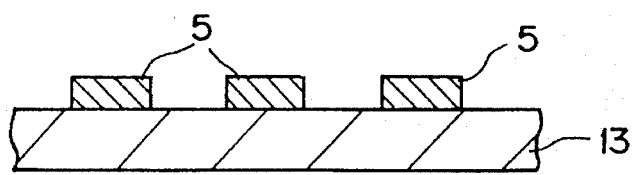
FIG. 4E
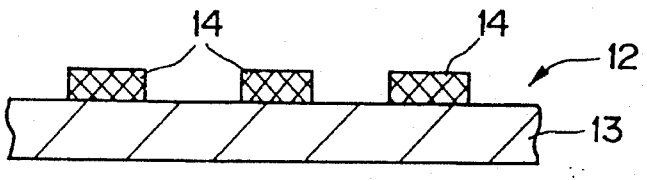

F I G. 8A
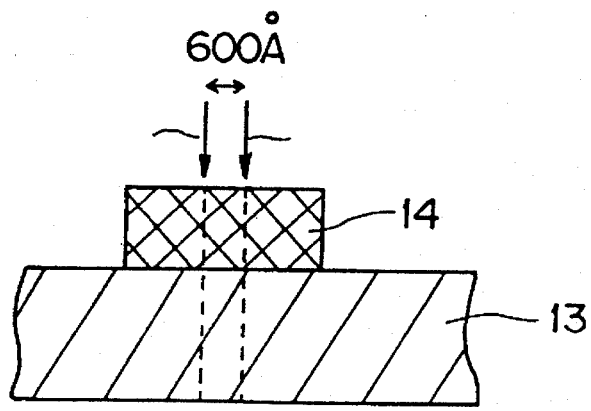
F I G. 8B
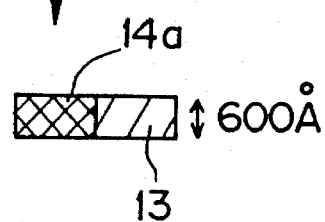

PRESENT INVENTION SAMPLE 1

0 — 200 nm

SUBSTRATE SIDE

PRESENT INVENTION SAMPLE 1

PRESENT INVENTION SAMPLE 3

SUBSTRATE SIDE

PRESENT INVENTION SAMPLE 3

COMPARISON SAMPLE 1

COMPARISON SAMPLE 1

BLACK MATRIX SUBSTRATE, AND COLOR FILTER AND LIQUID CRYSTAL DISPLAY DEVICE USING THE SAME

This application is a Rule 60 divisional application of U.S. Ser. No. 08/203,569, filed Mar. 1, 1994, now patented (5,501,900).

BACKGROUND OF THE INVENTION

1. Field of the Invention

The present invention generally relates to a black matrix substrate, a color filter using the substrate and a liquid crystal display device using the substrate. More particularly, it relates to a black matrix substrate which has a high dimensional accuracy and a good light-shielding property, a color filter which has a high contrast ratio, and a liquid crystal display device of excellent image quality.

2. Description of the Prior Art

Much attention has been paid recently to liquid crystal display devices of monochromatic or full color type as a flat display device. In order to control three primary colors in such a liquid crystal display device, there are an active matrix method and a simple matrix method, each of which utilizes a color filter. The liquid crystal display device is constructed to perform color display by using picture elements of three primary colors (R, G, B) and controlling the transmission of each light of the three primary colors by electrical switching of the liquid crystal.

This color filter is constructed by forming each colored layer, a protection layer and a transparent electrode layer on a transparent substrate. In order to improve a color developing effect and a display contrast, there is formed a pattern (black matrix), which has a light-shielding property, at a boundary portion of each R, G, B picture element of the colored layer. In case of the liquid crystal display device of the active matrix method type, since a thin film transistor (TFT) is employed as a switching element, it becomes necessary to inhibit leaking of photo-current due to an external light. Thus, it is necessary that the black matrix exhibit a very high light-shielding property.

As black matrixes used in the above mentioned prior arts, there are a black matrix obtained by forming a relief through photo-etching of a chrome thin film formed by vapor deposition or sputtering technique etc., a black matrix which is formed by dyeing a hydrophilic resin relief, a black matrix obtained by forming a relief using a photo-sensitive resin dispersed with black pigment, a black matrix obtained by electrodeposition of a black electrocoating paint, a black matrix which is formed by printing technique, and so on.

However, in case of the above-mentioned black matrix, which is relief-formed by photo-etching the chrome thin film, although the accuracy in dimension is high because it uses the photo-process, the production cost is high because it requires the vacuum film forming process such as the vapor deposition or sputtering process and the production procedure is rather complicated. Further, in this case, in order to improve the display contrast under a strong external light circumstance, it becomes necessary to restrain the reflectance at the side of the observer, so that a low reflection chrome sputtering process etc. is required which further increases the production cost. On the other hand, in case of the above mentioned method of using the photo-sensitive resist dispersed with black color dye or pigment in advance, although the production cost can be lowered, the photo-process tends to be unstable because the photo-sensitive resist has black color. Consequently, a sufficient light-shielding property is difficult to obtain if more attention is paid to the accuracy in dimension. In this manner, there is a problem that a high quality black matrix is difficult to obtain. Further, in case of the above mentioned black matrix formation by use of the printing technique, although the production cost can be lowered to some extent, there arises a problem in case that the high dimensional accuracy is required.

On the other hand, the color filter is constructed by providing a colored layer, which consists of a plurality of colored patterns, between the space of the black pattern of the black matrix substrate, and by further providing a transparent electrode on this colored layer.

The liquid crystal display device is provided with the above mentioned color filter, an electrode substrate formed with an electrode on a substrate, and a liquid crystal layer, in which the transparent electrode of the color filter and the electrode of the electrode substrate are opposed to each other, and the liquid crystal layer is interposed between these electrodes.

However, in the above mentioned color filter and the liquid crystal display device, since the light-shielding property and the accuracy in dimension are not sufficient as aforementioned in the black matrix substrate used by them, it is often difficult to obtain a sufficient contrast ratio, and there is room for improving the image quality thereof.

SUMMARY OF THE INVENTION

It is therefore a first object of the present invention to provide a black matrix substrate, which has a high dimensional accuracy, a high light-shielding property, and a low reflectance, and which is suitable to form a color filter for a color sensor, a flat display device such as a liquid crystal display device, an image such as CCD (Charge Coupled Device), and so on.

It is a second object of the present invention to provide a color filter having a high contrast ratio, and a liquid crystal display device having excellent image quality.

According to the present invention, the above mentioned first object can be achieved by a black matrix substrate, which is provided with: a substrate; and a black pattern formed on the substrate, wherein the black pattern comprises a resin pattern, which is formed in a pattern shape, and includes at least metal particles inside thereof, the metal particles have such a particle diameter distribution that particles having particle diameters in a range of 5 nm to 50 nm are not less than 80% of the total particles, a projected area density at a conversion of 600 Å (angstrom) thickness of the metal particles in the black pattern, is not less than 60%, and an optical density of the black matrix substrate is not less than 1.5.

Consequently, the black matrix substrate of the present invention has a high dimensional accuracy, a high light-shielding property and a low reflectance.

According to the present invention, the above mentioned second object can be achieved by a color filter, which is provided with: a black matrix substrate comprising a substrate and a black pattern formed on the substrate; a colored layer comprising a plurality of color patterns formed between the black pattern on the black matrix substrate; and a transparent electrode formed on the colored layer, wherein the black pattern comprises a resin pattern, which is formed in a pattern shape, and includes at least metal particles inside thereof, the metal particles have such a particle diameter distribution that particles having particle diameters in a range of 5 nm to 50 nm are not less than 80% of the total particles, a projected area density at a conversion of 600 Å thickness of the metal particles in the black pattern, is not less than 60%, and an optical density of the black matrix substrate is not less than 1.5.

Consequently, the color filter of the present invention has a high contrast ratio.

According to the present invention, the above mentioned second object can also be achieved by a liquid crystal display device, which is provided with: a color filter comprising a black matrix substrate comprising a first substrate and a black pattern formed on the first substrate, a colored layer comprising a plurality of color patterns formed between the black pattern on the black matrix substrate and a transparent electrode formed on the colored layer; an electrode substrate comprising a second substrate and an electrode formed on the second substrate; and a liquid crystal layer, the transparent electrode of the color filter and the electrode of the electrode substrate being opposed to each other, the liquid crystal layer being disposed between those electrodes, wherein the black pattern comprises a resin pattern, which is formed in a pattern shape, and includes at least metal particles inside thereof, the metal particles have such a particle diameter distribution that particles having particle diameters in a range of 5 nm to 50 nm are not less than 80% of the total particles, a projected area density at a conversion of 600 Å thickness of the metal particles in the black pattern, is not less than 60%, and an optical density of the black matrix substrate is not less than 1.5.

Consequently, the liquid crystal display device of the present invention has a good image quality.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3 is a magnified partial sectional view of the color filter used in the liquid crystal display device of FIG.

FIG. 4 is a process diagram showing one example of a method suitably employed to manufacture a black matrix substrate of the present invention;

FIG. 8 is a diagram schematically showing a method to measure a projected area density of a particle, in which FIG. 8A shows a condition of slicing a detached black color pattern 14 by a width of 600 Å (angstrom) in the direction of its thickness, FIG. 8B shows the condition of observing the sliced piece 14a from the sliced surface direction by use of a transmission electron microscope;

DETAILED DESCRIPTION OF THE PREFERRED EMBODIMENTS

Referring to the accompanying drawings, embodiments of the present invention will be now explained.

Figure 1:
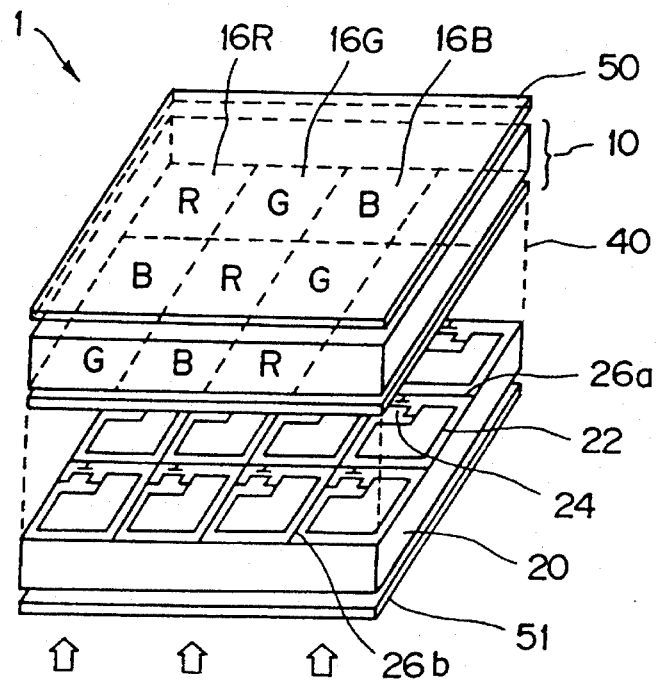
FIG. 1 is a perspective view showing one example of an active matrix type liquid crystal display device, which uses a color filter of the present invention.
Figure 2:
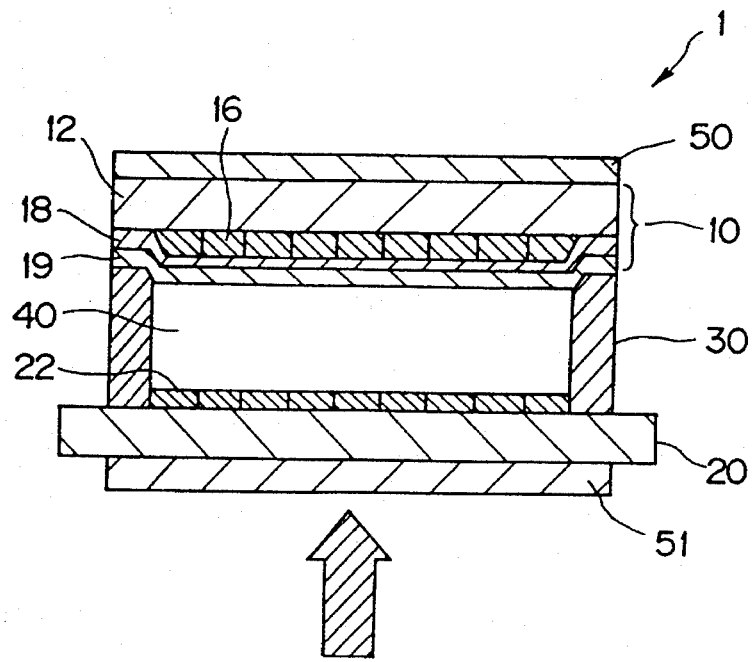
FIG. 2 is a summarized sectional view of the liquid crystal display device of FIG. 1.

FIG. 1 is a perspective view showing one example of an active matrix type liquid crystal display device (LCD), which uses a black matrix substrate of the present invention. FIG. 2 is a summarized sectional view of the liquid crystal display device of FIG. 1.

In FIG. 1 and FIG. 2, a LCD 1 is constructed as follows. Namely, a color filter 10 and a transparent glass substrate 20 are opposed to each other through a seal member 30. A liquid crystal layer 40, which has a thickness of about 5 to 10 μm and which comprises twisted nematic (TN) liquid crystal, is disposed between them. Light polarization plates 50 and 51, are disposed at the outer sides of the color filter 10 and the transparent Glass substrate 20.

FIG. 3 is a magnified partial sectional view of the color filter 10.

In FIG. 3, the color filter 10 is provided with a black matrix substrate 12, which is constructed by forming black pattern (black relief or black matrix) 14 on a transparent substrate 13, a colored layer 16, which is disposed between the spaces of the black matrix 14 of the black matrix substrate 12, a protection layer 18, which is disposed to cover the black matrix 14 and the colored layer 16, and a transparent electrode 19. The color filter 10 is disposed such that the transparent electrode 19 is positioned at the side of the liquid crystal layer 40. The colored layer 16 has red pattern 16R, Green pattern 16G and blue pattern 16B, which are arranged in a mosaic arrangement as shown in FIG. 1. The arrangement of the colored pattern is not limited to this. Instead, a triangle arrangement, a stripe arrangement etc. may be employed here.

On the other hand, on the transparent glass substrate 20, display electrodes 22 are disposed in correspondence with each colored pattern 16R, 16G, 16B. Each of the display electrodes 22 has a thin film transistor (TFT) 24. Scanning lines (gate electrode base lines) 26a and data lines 26b are disposed between the display electrodes 22 in correspondence with the black matrix 14.

In the LCD 1, each of the colored patterns 16R, 16G and 16B constructs a picture element, so that the liquid crystal layer 40 is operated as a shutter by turning ON/OFF the display electrode corresponding to each picture element under the condition that illumination light is irradiated from the side of the polarization plate 51, and the color display is able to work by transmitting the light through each picture element of the display patterns 16R, 16G and 16B.

Figure 5:
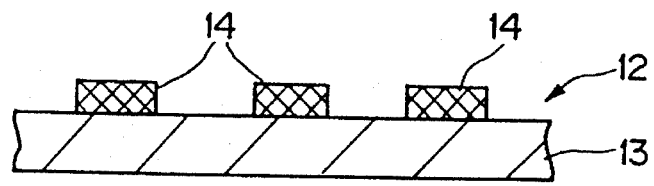
FIG. 5 is a summarized sectional view of the black matrix substrate of the present invention.

The black matrix substrate 12 constructing the color filter 10, is provided with a substrate 13 and the black pattern 14, which is formed on the substrate 13 and includes at least metal particles therein, as shown in FIG. 5.

As the substrate 13, a transparent substrate or a substrate having a reflection portion, may be used. As the transparent substrate, rigid material having no flexibility such as quartz glass, borosilicate glass, soda lime glass, a low expansion glass etc., may be used. Alternatively, material having flexibility, such as transparent resin film, optical resin plate etc., may be used. Among those, 7059 glass made by Corning. Co., is especially suitable for the color filter of the active matrix LCD, since it is a material having a low thermal expansion coefficient, thus giving a good stabilization property in dimension and a good operatability in a high temperature heat treatment, and since it is nonalkaline glass which does not include an alkali component. For the usage of the reflection projecting type etc., a metal reflection film may be formed on one side of the transparent substrate, or a metal reflection film, may be used for the display electrode of the thin film transistor or the active matrix on the silicon substrate. If a substrate having the reflection portion is utilized, it becomes a-black matrix substrate for a color filter of reflection type, which is suitable for display modes of the reflection projection mode, the Guest Host mode and the scattering mode.

The black pattern 14 has resin formed in a predetermined pattern shape (hereinbelow, it is referred to as "resin pattern"), and metal particles included in this resin. The black pattern 14 is formed by depositing the metal particles in the resin pattern containing a catalyst by electroless plating by use of reducing agent having a capability of reducing metal ion included in the electroless plating solution. As the resin used for the resin pattern, the resin, which can be formed by a printing method or photolithography method, can be adapted. As the resin used in the printing method, there are various known gravure inks etc. with respect to the engrave plate offset printing, for example. In this case, the catalyst component, which will be explained later on, may be included in the ink in advance, or the catalyst component may be soaked in the ion condition in the afterprocess, so that the catalytic property is given by reducing afterward. As for the resin used in the photolithography method, it will be explained afterward together with the process.

The metal particles included in the black pattern 14 preferably have such a particle diameter distribution that particles having particle diameters in a range of 5 nm to 50 nm are not less than 80% of the total particles, particles. More preferably the metal particles have such a particle diameter distribution that particles having particle diameters in a range of 10 nm to 30 nm most preferably 10 nm to 20 nm, are not less than 80% of the total particles, in order to make the optical density high while keeping the reflectance low. If it does not have this kind of particle diameter distribution, and if there are increased particles which diameters are more than 50 nm, the metal particles not only have the reflecting property but also form a continuous film on the film surface, thus resulting in a problem that the film surface is covered by the continuous film and the plating reaction in the resin is disturbed. On the other hand, if it does not have this kind of particle diameter distribution, and if there are increased particles which diameters are less than 5 nm, a problem results that the optical density (more than 1.5) which is required as a black matrix, cannot be obtained. In the present invention, the particle diameter means a value, which is obtained by measuring firstly sample diameters of 100 samples, for example, by means of TEM profile photographing of a black matrix sliced piece, and then statistically processing the measured result.

The projection area density, which is obtained by measuring the ratio of shade area made by the metal particles to the whole area in the black matrix pattern 14, is preferably not less than 60%, and more preferably not less than 80%, and it is necessary that the optical density of the black pattern is not less than 1.5. If the projected area density at a conversion of 600 Å thickness of the particles is less than 60%, even if the particle diameter is within the above mentioned prescription of the present invention, the necessary optical density cannot be obtained. The optical density is also related with the thickness of the film of the black pattern 14. Therefore, this thickness is set so that the optical density becomes more than 1.5. If the optical density is less than 1.5, the light-shielding property as the black matrix becomes insufficient. The projected area density at a conversion of 600 Å thickness of the particles is, as shown in FIG. 8, obtained by performing a super-microtome with respect to the black pattern 14 in the direction of its thickness, slicing it by a width of 600 Å (FIG. 8A), and observing this sliced piece 14a from the direction of the sliced surface by means of a transmission electron microscope (FIG. 8B). As one concrete example of measuring method, the thickness of the sliced piece is measured by a multiplex differential interference type microscope etc., and one close to 600 Å is selected to be used. It is difficult to slice it just by 600 Å. Therefore, assuming that the thickness of the sliced piece close to 600 Å is t (Å) and that the measured value d(%) is obtained as the projected area density at this time, its conversion to the projected area density D (%) of 600 Å thickness is calculated by the following formula.

$$D = \left[ 1 - \left( 1 - \frac{d}{100} \right)^{\frac{600}{t}} \right] \times 100$$

The particle diameter of the metal particle is varied due to the factors of, for example, (1) the plating time, (2) the plating bath temperature or the pH of the plating solution in the process of plating reaction, (3) the stirring vibration motion of the plating solution (4) the concentration of the catalyst treatment solution at the time of applying the catalyst into resin pattern and the catalyst treatment time thereof and so on, in the manufacturing method of the black matrix substrate. At least one of the reflectance from the substrate side of the black pattern 14 and the reflectance from the surface side of the black pattern, is preferably not more than 30%, and more preferably not more than 15%. If it exceeds 30%, the reflection due to the external light disturbs the image quality, resulting in an insufficient display contrast.

One example of the method of manufacturing the black matrix substrate 12 of the present invention, will be explained hereinbelow with referring to FIG. 4. The resin pattern is formed by means of the photolithography technique, here. Firstly, a photo-sensitive resist layer 3, which has a thickness of about 0.1 to 5.0 μm, is formed by coating photo-sensitive resist, which includes hydrophilic resin, on the substrate 13 (FIG. 4A). Nextly, the photo-sensitive resist layer 3 is light-exposed through a photomask 9 for the black matrix (FIG. 4B). Then, the photo-sensitive resist layer 3 after light-exposure, is developed, so that the relief image 4 (resin pattern) having the pattern for the black matrix, is obtained (FIG. 4C). Nextly, after applying a heat treatment (70° to 200° C., about 5 to 60 minutes) to the transparent substrate 13, the relief image 4 is soaked in an aqueous solution of the metal compound serving as a catalyst for the electroless plating, so that the relief 5 including catalyst (resin pattern including catalyst), is obtained after washing by water (FIG. 4D). Then, the black pattern(black relief) 14 is obtained by contacting the relief 5 including catalyst on the transparent substrate 13 with the electroless plating solution, and further, a film-hardening treatment by applying heat or applying film hardening agent, is applied to this black pattern to produce the black matrix substrate 12 (FIG. 4E). The heat process may be applied after forming the relief including catalyst.

Figure 6A:
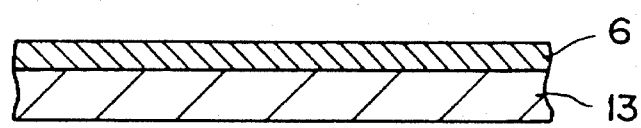
FIG. 6 is a process diagram showing another example of a method suitably employed to manufacture a black matrix substrate of the present invention.
Figure 6B:
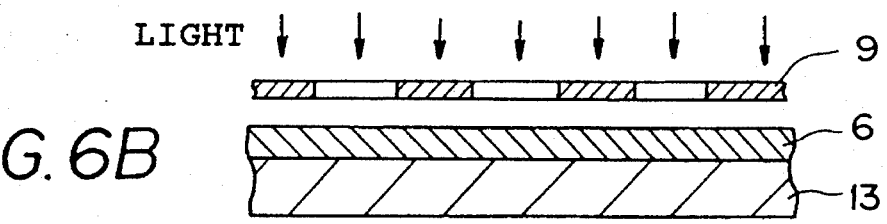
Figure 6C:
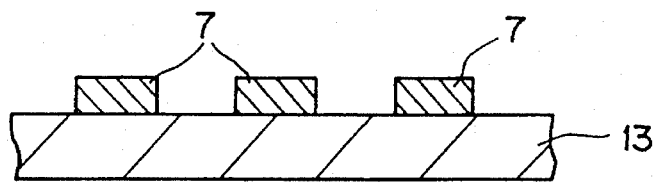

In the example shown in FIG. 6, the photo-sensitive resist layer 6, which has a thickness of about 0.1 to 5.0 μm, is formed on the substrate 13 by coating photo-sensitive resist including hydrophilic resin and aqueous solution of metal compound serving as a catalyst for the electroless plating (FIG. 6A). Nextly, the photo-sensitive resist layer 6 is light-exposed through the photomask 9 for the black matrix (FIG. 6B). Then, the photo-sensitive resist layer 6 is developed and dried after light exposure, so that a relief image (resin pattern including catalyst) 7, which has a pattern for the black matrix is obtained (FIG. 6C). The relief image 7 in this case, is different from the relief image 4 shown in FIG. 4, and is a relief including catalyst (resin pattern including catalyst), which includes metal compound to be the catalyst for the electroless plating.

Figure 6D:
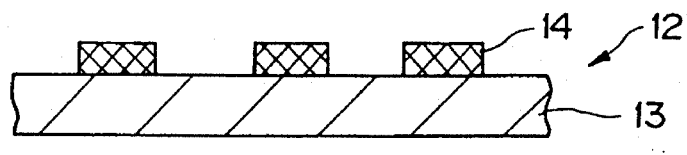

In order to produce the black pattern (black matrix) 14 by use of the relief image 7 constructed as above, firstly, heat treatment (70° to 200° C., about 5 to 60 minutes) is applied to the relief image 7, and then the relief image (relief including catalyst) 7 on the substrate 13 is contacted with the electroless plating solution, so that the metal particles are deposited in the relief to be black-colored, and finally the black pattern (black matrix) 14 is formed (FIG. 6D). In this case, the film hardening process by applying heat or film hardening agent may be also performed to the black matrix.

Figure 7A:
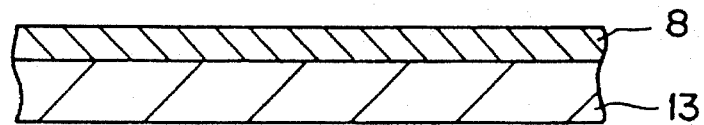
FIG. 7 is a process diagram showing another example of a method suitably employed to manufacture a black matrix substrate of the present invention.
Figure 7B:
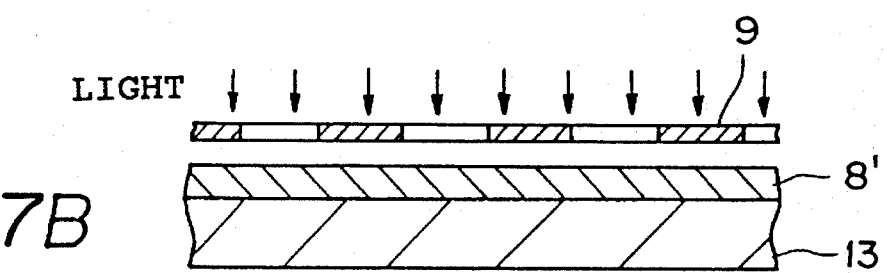

Further, in the example shown in FIG. 7, firstly, the photo-sensitive resist layer 8, which has a thickness of about 0.1 to 5.0 μm, preferably about 0.1 to 2.0 μm, is formed by coating photo-sensitive resist including hydrophilic resin, compound having diazo group or azide group and the metal compound serving as a catalyst for the electroless plating, on the transparent substrate 13 and drying it (FIG. 7A). Here, it is known that the compound having the diazo group or the azide group, is effective in restraining the plating in the process of electroless plating, and that when the resist, which includes, the hydropdhilic resin and the compound serving as a catalyst for the electroless plating, is subjected to pattern exposure and then brought into contact with electroless plating solution, metal particles are formed in the resist by the electroless plating to form a light-shielding layer (Japanese Patent Application Laid Open No. Sho. 57-104928, 57-104929). Nextly, a relief image 8' of the present invention is formed by light-exposing the photo-sensitive resist layer 8 through the photomask 9 for the black matrix (FIG. 7B). Namely, this relief image 8' is to be a relief including catalyst, which includes the metal compound serving as a catalyst for the electroless plating, and in which the above mentioned plating restraining effect by the diazo group or the azide group is released in the pattern shape of the black matrix by the light-exposure.

Figure 7C:
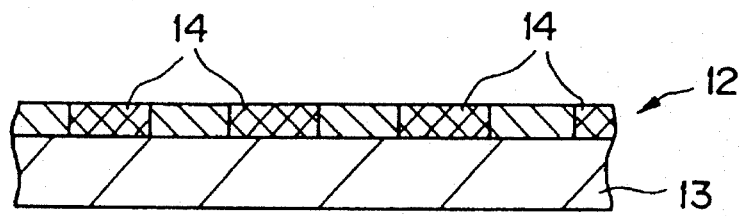

In order to produce the black matrix 14 by use of the relief image 8' constructed as above, the substrate 13 is contacted with the electroless plating solution, so that the metal particles of the electroless plating are disposed at the light-exposed portions to be black-colored, so that the black matrix 14 is finally obtained (FIG. 7C).

Figure 7D:
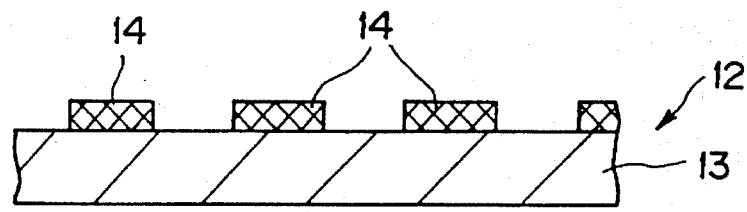

The portions, which are not light-exposed, may be removed by developing as shown in FIG. 7D.

In the above mentioned examples of the production method of the black matrix substrate, a common feature is that the electroless plating process is not performed by use of plating bath at a temperature of about 70° C. to 90° C. as in the conventional electroless plating, but is performed by use of that at a temperature of about 20° C. to 40° C. under the existence of the metal compound serving as a catalyst for electroless plating, and that the reduction of the metal salt, which is included in the electroless plating solution, is performed very slowly compared with the conventional electroless plating, by use of a reducing agent capable of reducing the metal compound and the metal salt. So, the metal particles are slowly deposited to grow in the resist (resin) so that the metal particles are homogeneously deposited in the black pattern (light shading layer).

Therefore, the black pattern includes the metal particles and, under some circumstances, the metal salt to be reduced. The black pattern also includes the metal compound to be the electrolessly plated and, under some circumstances, the metal generated by reducing this metal compound. The black pattern further includes the reducing agent.

The resin pattern of the black pattern 14 is formed by use of natural protein, protein which is made from natural protein with artifical treatment, hydrophilic natural resin, hydrophilic synthetic resin, etc.. Among these, a photo-sensitive resist is especially suitable for the resin pattern since it is capable of forming a relief pattern with high dimentional accuracy.

As the photo-sensitive resist, there are, for example, natural protein such as gelatin, casein, glue, egg white albumin, etc., carboxymethyl-cellulose, polyvinyl alcohol, polyacrylic acid, polyacrylamide, polyvinyl pyrrolidone, polyethylene oxide, and maleic anhydride copolymer. As another example thereof, there is material to which the photo-sensitivity is given by adding material which has a photo-sensitive group of photo-hardening type, such as diazonium compound having diazo group, diazo resin which is the reaction product of paraformaldehyde, azide compound having azide group, cinnamic acid condensed resin which is produced by condensing cinnamic acid to polyvinyl alcohol, resin using stilbazolium salt, heavy chromate ammonium etc., with respect to simple or mixed substances of hydrophilic resin such as the above mentioned resin which is modified by carboxylic acid or sulfonic acid. Inorganic material such as ceramics or porous alumina etc., may be added to the photo-sensitive resist. This inorganic material may be included in the photo-sensitive resist at a range of 0.1 to 10 wt %. The photo-sensitive group is not limited to the above mentioned photo-hardening type photo-sensitive group. In this manner, by making the photo-sensitive resist include the hydrophilic resin, when the relief 5 including catalyst contacts with the electroless plating solution as aforementioned, the electroless plating solution can easily permeate the relief 5 including catalyst, so that the metal particles can be deposited to grow homogeneously, in the relief 5 including catalyst.

As the hydrophilic polyvinyl alcohol resin, there are modified polyvinyl alcohol and non-modified polyvinyl alcohol. Further, as the above mentioned modified polyvinyl alcohol, there is polyvinyl alcohol which is modified by sulfonic acid group, acetoacetyl group, cationic group, acrylicamide group, or carboxyl group, for example. The saponification value of these hydrophilic polyvinyl alcohol resin is preferably 86 to 99, and the average degree of polymerization thereof is preferably 500 to 1700.

Here, it is important to have a good depositing property of the metal particles into the resin pattern including the catalyst component as mentioned before, in order to obtain the high optical density property, the low reflectance property etc., as the demanded properties for the black matrix. This depositing property of the metal particles is considered to have a strong relationship with the osmosis of the electroless plating solution in the resin pattern including the catalyst. Therefore, the structural property of the polyvinyl alcohol resin included in the photo-sensitive resist, becomes important. In general, it is known that the swelling property of a coated film of a polyvinyl alcohol film in aqueous solution, depends on its crystallization property. Thus, it is considered that the osmosis of the electroless plating solution depends on the crystallization property of the polyvinyl alcohol in the photo-sensitive resist.

In the present invention, in view of the above discussion, the X ray scattering intensity value, when the crystallization of the polyvinyl alcohol in the resin pattern before forming the black pattern is evaluated by the scattering intensity value of the X ray diffraction method, is preferably in a range of 200 to 580 cps/μm, and is more preferably in a range of 300 to 400 cps/μm. If this scattering intensity value exceeds 580 cps/μm, the depositing property of the metal particles into the resin pattern is degraded, so that the black matrix having a high optical density (about not less than 3) cannot be obtained. On the other hand, if this scattering intensity value is less than 200 cps/μm, there is caused a problem that the resin pattern including the catalyst (relief including catalyst) is dissolved in the electroless plating solution.

In order to set the X ray scattering intensity value of the polyvinyl alcohol in the resin pattern before forming the black pattern to the aforementioned preferable range, for example, the X ray scattering intensity value of the polvinyl alcohol in the photo-sensitive resist, may be set to the aforementioned preferable range, or the X ray scattering intensity value of the polyvinyl alcohol to form the resin pattern including the catalyst may be set to the aforementioned preferable range by controlling the condition of the heat treatment process of the resin pattern including the catalyst in the process shown in FIG. 4, for example.

In this manner, by setting the X ray scattering intensity value of the polyvinyl alcohol in the resin pattern before forming the black pattern, to a value within the aforementioned preferable range, when the relief including catalyst contacts with the electroless plating solution, the electroless plating solution can easily permeate into the relief including catalyst, so that the metal particles deposit in the relief including catalyst homogeneously and speedily. Thereby, the formed black matrix 14 has a high optical density and a low reflectance while the accuracy in dimension is high, and the problem of the reflection by the metal layer in the black matrix consisting of a chromium film in the aforementioned prior art, can be solved.

As the metal compound used as the catalyst for the electroless plating used in the present invention, there are water soluble salts and complex compounds of chloride, sulfate, nitrate etc. of palladium (Pd), gold (Au), silver (Ag), tin (Sn), zinc (Zn), platinum (Pt), copper (Cu) for example. Especially, in the present invention, an activator solution for electroless plating, which is sold in the market as an aqueous solution, can be used as it is, or after diluting it. When including this kind of metal compound into the photo-sensitive resist as mentioned above, it is preferable that it is included by about 0.01 to 5 wt % at a conversion of metal ion.

As the electroless plating solution used in the present invention, there is electroless plating solution including: reducing agent such as hypophosphrous acid, sodium hypophosphite, boron sodium hydride, N-dimethylamine borane, borazine derivative, hydrazine and formalin; water soluble heavy metal salts, which are to be reduced (which forms metal ion in the plating solution), of metals such as nickel (Ni), cobalt (Co), iron (Fe), copper (Cu), chromium (Cr), palladium (Pd), gold (Au), platinum (Pt), tin (Sn) and zinc (Zn); basic compounds to improve the plating speed and the reducing effect etc. such as sodium hydroxide, potassium hydroxide and ammonium hydroxide; pH adjusting agents such as inorganic acid and organic acid; buffer agents represent by alkaline salts of oxocarboxylic acid such as sodium citrate and sodium acetate, boric acid, carbonic acid, organic acid and inorganic acid; and complexing agents, represent by organic carboxylic acids such as citric acid, trisodium titrate, hydrogen diammonium citrate, tartaric acid, sodium tartrate, glycollic acid, sodium succinate, sodium malonate, glycine, Rochelle salt, malic acid, ethylenediamine, diethyletriamine, triethylene tetramine, and the salts of those acids, to aim at stabilizing the heavy metal ion, reaction promoting agent, stablilizing agent, surface activate agent and so on. The concentration of the reducing agent is preferably 0.03 to 0.07 mol/l, the concentration of the complexing agent is preferably 0.1 to 1.0 mol/l, and the concentration of the metal salt is preferably 0.1 to 0.3 mol/l in the electroless plating solution, respectively.

The pH value of the electroless plating solution is preferably 6 to 9, and the temperature of the plating solution is preferably 20° to 40° C., to control the reaction rate in the electroless plating.

More than one kind of electroless plating liquid may be used together. For example, firstly, an electroless plating solution including boron type reducing agent such as boron sodium hydride which tends to form a nucleus (for example, a nucleus of palladium in case of using palladium as the metal compound to be the catalyst for the electroless plating), is used, and nextly, an electroless plating solution including hypophoshite type reducing agent having a high metal depositing rate, is used.

In the above various kinds of the reducing agents, the boron type reducing agent can be used preferably, since it is superior in the capability of reducing both of the metal compound to be the catalyst for the electroless plating, and the metal salt to be reduced, at the same time.

The formation of the colored layer 16, which comprises the red pattern 16R, the green pattern 16G and the blue pattern 16B between the black matrix 14 of the above mentioned black matrix substrate 12, can be performed by various known methods, such as the photo-resist coloring method, the dispersing method to perform patterning by photolithography after coating the photo-sensitive resin dispersed with pigment in advance, the printing method, e.g. offset printing, and the electrodepositing method.

The protection layer 18 may be provided such that it covers the black matrix 14 and the colored layer 16 of the color filter 10, so as to smooth the surface of the color filter 10, improve the reliability of the color filter 10, and prevent the contamination to the liquid crystal layer 40. The protection layer 18 may be formed by use of transparent resin such as acrylic resin, polyurethane resin, polyester resin, epoxy resin and polyimide resin, wherein especially the resin of thermo-setting or photo-setting type, can be preferably used. Alternatively, it may be formed by use of transparent inorganic compound such as silicon dioxide. The thickness of the protection layer 18 is preferably about 0.5 to 50 μm.

As the transparent common electrode 19, indium tin oxide (ITO) film can be used, for example. This ITO film can be formed by various known methods, such as the vapor deposition method and the sputtering method. The thickness of this ITO film is preferably about 200 to 2000 Å.

Nextly, the present invention will be explained tin more detail, by showing its experimental examples.

Experimental Example 1

(Production of a Sample 1 of the Present Invention)

As the transparent substrate, a plasma-treated polyester film (Lumirror T/100, made by Toray Industries, Inc.) with thickness of about 100 μm, which is attached onto a glass substrate, is prepared. The photo-sensitive resist having the composition listed below, is coated on this polyester film of the glass substrate, by a spinner coating method (1500 r.p.m.), to have a thickness of about 0.6 μm. After that, it is dried at a temperature of about 70° C. for about 10 minutes, so that the photo-sensitive resist layer is formed.

composition of the photo-sensitive resist polyvinyl alcohol (Gohsenal T-330, made by Nippon Synthtic Chemical Industry Co.,Ltd.) 4.47% aqueous solution 100 wt parts diazo resin (D-011, made by shinco Giken Co,) 4.47% aqueous solutionz 5.71 wt. parts Nextly, the transparent film, which has the photo-sensitive resist layer, is removed from the glass, and after that, this film is exposed by light through the photomask for forming the black matrix (negative type, line width =20 μm). As the light source, a super high pressure mercury lamp 2 Kw is used, to expose for 2 seconds. After that, by use of water at room temperature, the spray development is performed, and then, the air drying is performed. Nextly, a heat treatment is applied to this transparent film at a temperature of about 100° C. for about 30 minutes, so that a relief having a thickness of about 20 μm for the black matrix, is formed.

Nextly, this transparent film is soaked in palladium chloride aqueous solution (5 times diluted solution of Red Sumer, made by Kanigen Co.) for 2 minutes. After water-washing and dewatering, it is soaked in nickel plating solution including dimethyl amine borane as reducing agent (nickel plating solution Top Chem Alloy B-1, made by Okuno chemical Industries Co.,Ltd.) at a temperature of about 30° C. for about minutes, and undergoes water-washing and drying, so that the light shading layer (black matrix) is formed, to obtain the black matrix substrate of the present invention.

Figure 9:
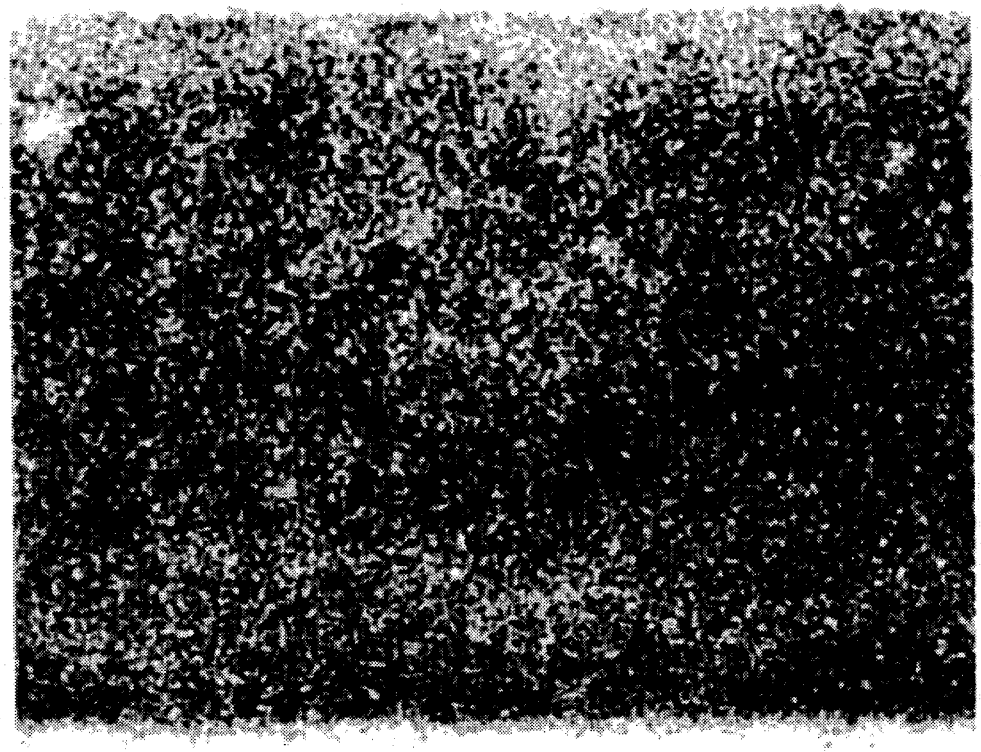
FIG. 9 is an electron microscope picture of a sliced piece, which is obtained by slicing a black pattern produced as a sample 1 of the present invention by a width of 600 Å in the direction of its thickness, when it is observed from the direction of the sliced surface, by use of a transmission electron microscope.
Figure 10:
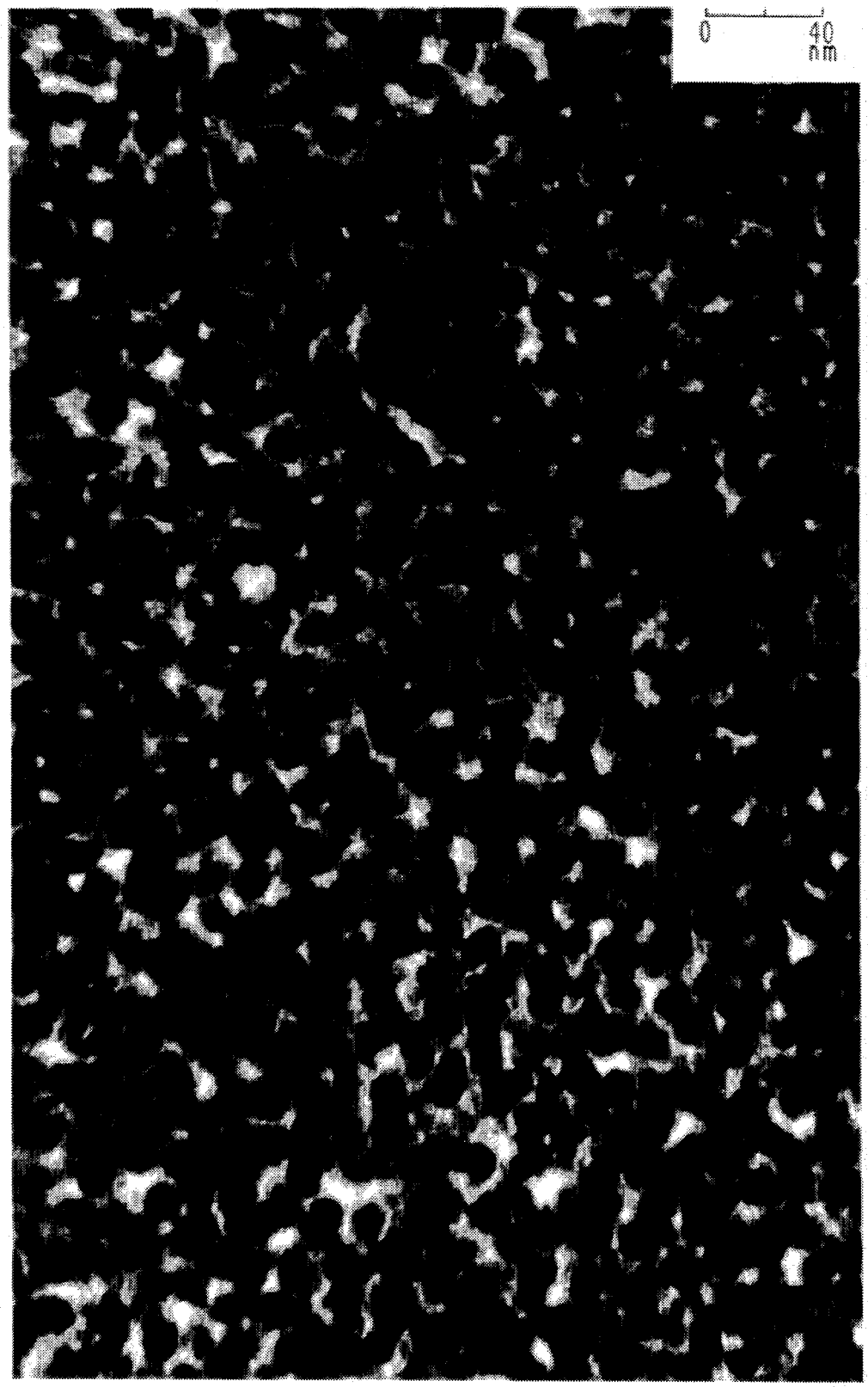
FIG. 10 is an electron microscope picture of the sliced piece same as in FIG. 9, when it is observed under the condition of a magnification of which is 5 times as high as that in FIG. 9.

The black pattern of this sample 1 is sliced by a width of 600 Å in the direction of its thickness. The sliced piece is observed by a transmission electron microscope (H-8100, made by Hitachi Ltd.) from the direction of the sliced surface, and photographing is conducted under the condition listed below. The taken electron microscope photograph is shown in FIG. 9.

photographing condition acceleration electric voltage . . . 200KV beam electric current . . . 10 μm converging variable diaphragm . . . 80 μm objective.variable diaphragm . . . 40 μm direct magnification (photographing magnification) . . . 20 K times enlarging magnification (final magnification) . . . 100 K times Further, with respect to the above mentioned sliced piece of the sample 1, photographing is conducted under the condition listed below. The electron microscope photograph is shown in FIG. 10.

photographing condition acceleration electric voltage . . . 200KV beamelectric current . . . 10 μm converging variable diaphragm . . . 80 μm objective variable diaphragm . . . 40 μm direct magnification (photographing magnification) . . . 100 K times enlarging magnification (final magnification) . . . 500 K times (Production of a Sample 2 of the Present Invention)

A sample 2 of the present invention is produced in the same manner as the above explained sample 1 of the present invention except for changing the plating time from 4 minutes to 10 minutes.

(Production of a Sample 3 of the Present Invention)

A sample 3 of the present invention is produced in the same manner as the above explained sample 1 of the present invention except for changing the plating time from 4 minutes to 15 minutes.

Figure 11:
FIG. 11 is an electron microscope picture of a sliced piece, which is obtained by slicing a black pattern produced as a sample 3 of the present invention by a width of 600 Å in the direction of its thickness, when it is observed from the direction of the sliced surface, by use of a transmission electron microscope.
Figure 12:
FIG. 12 is an electron microscope picture of the sliced piece same as in FIG. 11, when it is observed under the condition of a magnification of which is 5 times as high as that in FIG. 11.
Figure 13:
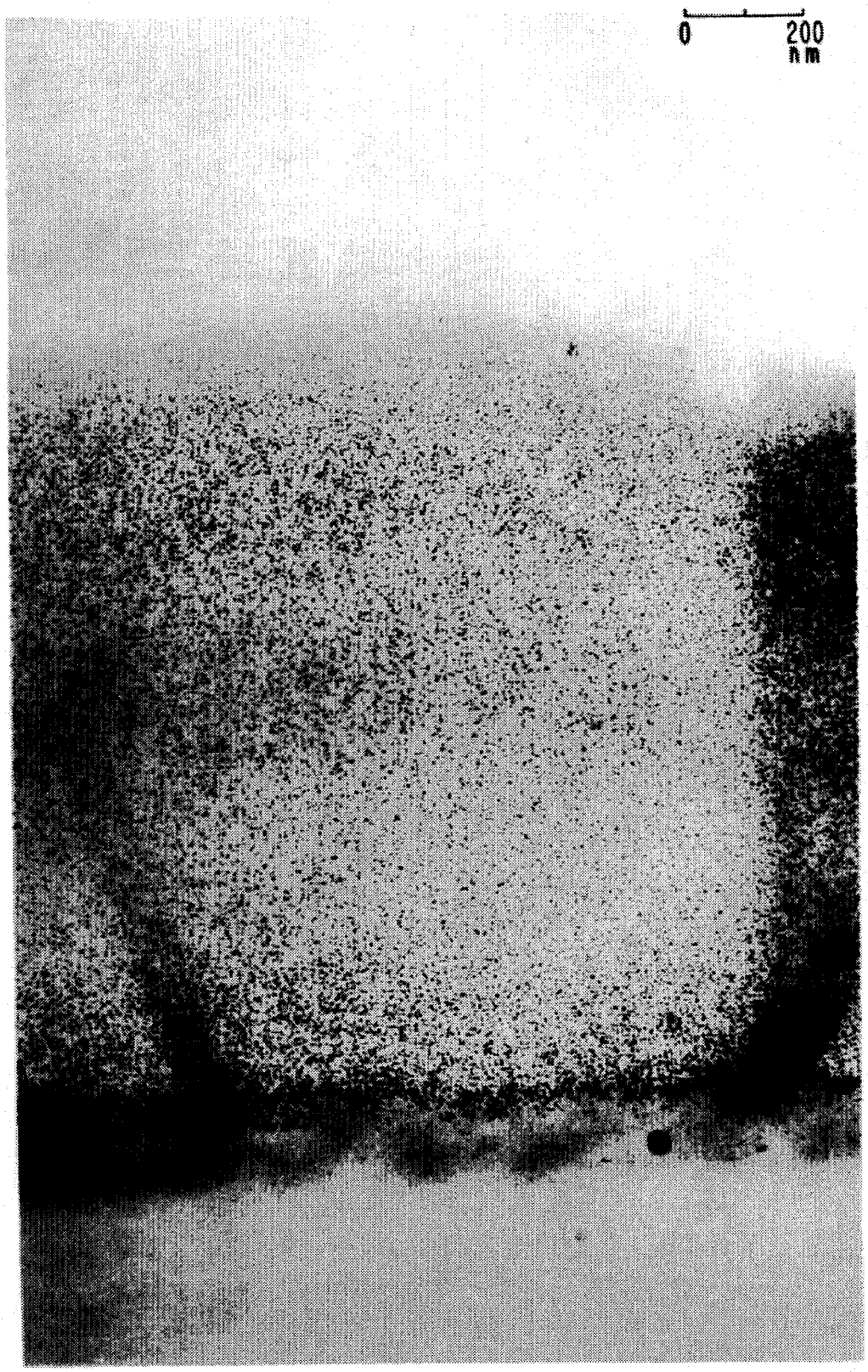
FIG. 13 is an electron microscope picture of a sliced piece, which is obtained by slicing a black pattern produced as a comparison sample by a width of 600 Å in the direction of its thickness, when it is observed from the direction of the sliced surface, by use of a transmission electron microscope.

The black pattern of this sample 3 is sliced by a width of 600 Å in the direction of its thickness. The sliced piece is observed by a transmission electron microscope from the direction of the sliced surface, and photographing is conducted under the condition listed below. The electron microscope photograph is shown in FIG. 11.

photographing condition acceleration electric voltage . . . 200KV beam electric current . . . 10 μm converging variable diaphragm . . . 80 μm objective variable diaphragm . . . 40 μm direct magnification (photographing magnification) . . . 20K times enlarging magnification (final magnification) . . . 100K times Further, with respect to the above mentioned sliced piece of the sample a, photographing is conducted under the condition listed below. The electron microscope photograph is shown in FIG. 12.

photographing condition acceleration electric voltage . . . 200KV beam electric current . . . 10 μm converging variable diaphragm . . . 80 μm objective variable diaphragm . . . 40 μm direct magnification (photographing magnification) . . . 100K times enlarging magnification (final magnification) . . . 500K times (Production of Sample 4 of the Present Invention)

A sample 4 of the present invention is produced as follows: Namely, until the relief forming process, the same processes to produce the aforementioned sample 1 are performed. Then, it is soaked in palladium chloride aqueous solution, which has high concentration available for catalyst (50 times diluted solution of Red Sumer, made by Kanigen Co.), as the catalyst activating solution, for 2 minutes. Then, after water washing and dewatering, it is soaked in nickel plating solution at a room temperature, which includes dimethyl amine borane as a reducing agent (nickel plating solution Top Chemi Alloy B-1, made by Okuno Chemical Industries Co.,Ltd.), for 9 minutes. Then, after water washing and drying, the black pattern (black matrix) is formed, so that the black matrix substrate is finally obtained.

(Production of a Sample 5 of the Present Invention)

A sample 5 of the present invention is produced in the same manner as the above explained sample 4 of the present invention except for changing the plating time from 9 minutes to 35 minutes.

(Production of a Comparison Sample 1)

A comparison sample 1 is produced in the same manner as the above explained sample 1 of the present invention except for changing the plating time from 4 minutes to 1 minute.

Figure 14:
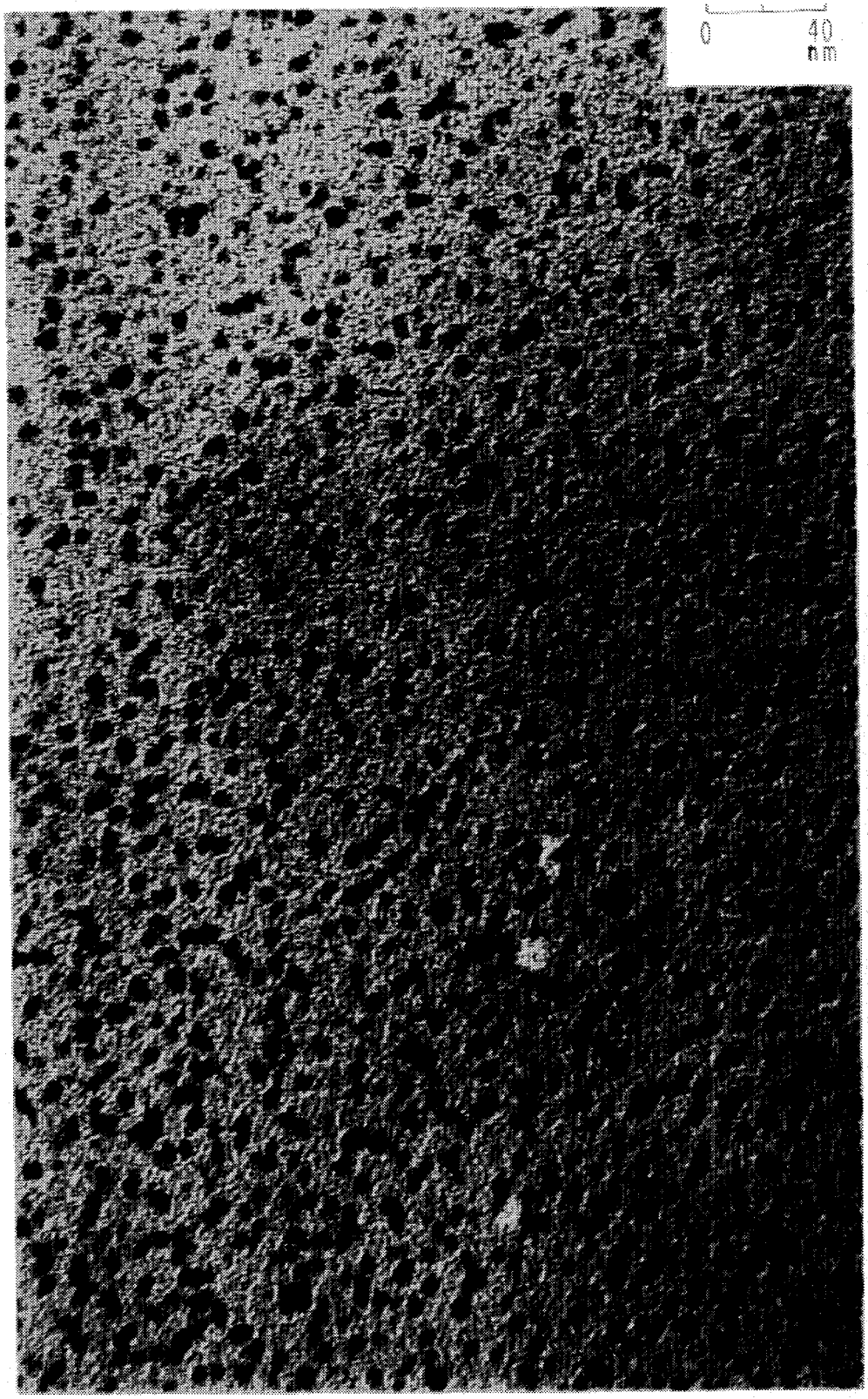
FIG. 14 is an electron microscope picture of the sliced piece same as in FIG. 13, when it is observed under the condition of a magnification of which is 5 times as high as that in FIG. 13.

The black pattern of this comparison sample 1 is sliced by a width of 600 Å in the direction of its thickness. The sliced piece is observed by a transmission electron microscope from the direction of the sliced surface, and photographing is conducted under the condition listed below. The electron microscope photograph is shown in FIG.

photographing condition acceleration electric voltage . . . 200KV beam electric current . . . 10 μm converging variable diaphragm . . . 80 μm objective variable diaphragm . . . 40 μm direct magnification (photographing magnification) . . . 20K times enlarging magnification (final magnification) . . . 100K times Further, with respect to the above mentioned sliced piece of the comparison sample 1, photographing is conducted under the condition listed below. The electron microscope photograph is shown in FIG. 14.

photographing condition acceleration electric voltage . . . 200KV beam electric current . . . 10 μm converging variable diaphragm . . . 80 μm objective variable diaphragm . . . 40 μm direct magnification (photographing magnification) . . . 100K times enlarging magnification (final magnification) . . . 500K times (Production of a Comparison Sample 2)

A comparison sample 2 is produced in the same manner as the aforementioned sample 1 of the present invention except for changing the plating time from 4 minutes to 2 minutes.

(Production of a Comparison Sample 3)

A comparison sample 3 is produced in the same manner as the aforementioned sample 4 of the present invention except for changing the plating time from 9 minutes to 3 minutes.

(Production of a Comparison Sample 4)

A comparison sample 4 is produced in the same manner as the aforementioned sample 4 of the present invention except changing the plating time from 9 minutes to 6 minutes.

With respect to those 9 samples (the samples 1 to 5 of the present invention, the comparison samples 1 to 4), the particle diameters and the projected area densities of the nickel fine particles deposited in the black pattern (light shading layer), are measured by a transmission electron microscope (H-8100, made by Hitachi Ltd.).

Further, the optical densities (OD) and the reflectances (R) of the black matrixes at the wavelength of 555 nm, are measured by a microscopectrophotometry device (AH2 SRK/STK, made by Olympus Kogaku Kogyo Co.), with respect to the regular reflected light of the light which is incident substantially perpendicularly to the substrate. The optical density (OD) of the black matrix is calculated by the following formula: OD=-log (T/100), with respect to the transmittance T (%) which is the highest value within the visible region of 400 to 700 nm measured by the above mentioned device by use of a standard value under a condition that the transparent substrate is used as a reference (100% transmittance) and the light is perfectly shut off as a background (0% transmittance). The reflectance is measured by using, as a standard, the case that there is no reflecting object at all with an aluminum vapor deposited plate as a background as a reference. As the reflectance, two kinds of reflectances are measured, namely, one reflectance in case that the light is irradiated from the substrate side (.observer side) of the black pattern 14 and another reflectance in case that the light is irradiated from the side of the surface (film surface) of the black pattern 14.

The measured results are shown in Table 1. In Table 1, the range of the optical density is set as OD≦3, since the transmittance is not more than 0.1% if the optical density is not less than 3, and since there is no meaningful difference of the value not more than 0.1%.

As understood from the results shown in Table 1, in each of the samples 1 to 5 of the present invention, the nickel particles which particle diameters are in the range of 5 to 50 nm, are 80% of the total particles, and the projected area density of the particles is not less than 60%. Therefore, the reflectance at the side of the observer (the opposite side of the film surface) is drastically reduced compared with the conventional metal chromium (the reflectance is not less than 60%), and the necessary optical density (not less than 1.5) as the black pattern of the light shading layer, can be sufficiently obtained, so that it is excellent as a black matrix substrate. Especially, the sample 1 of the present invention is superior in the reflectance from the film surface side. On the contrary, in each of the comparison samples 1 and 3, although the average particle diameter of the nickel particles is above 5 nm, the nickel particles, which particle diameters are less than 5 nm, are not less than 20% of the total particles and the projected area density of the particles is not more than 20%. Therefore, although the reflectance is rather low, the necessary optical density as the black pattern (black matrix) of the light shading layer, which is the fundamental function thereof, cannot be obtained, so that it is not sufficient as a black matrix substrate (this fact can be well confirmed by visual inspection). Further, in each of the comparison samples 2 and 4, the average particle diameter of the nickel particles is 9.3 nm, and 14.1 nm respectively, and the particles which have the particle diameters in the range of 5 to 50 nm, are not less than 80% of the total particles. Thus, although as for these, the values are within the prescription of the present invention, the projected area density of the particles is less than 60% (57.3%, 54.0%, respectively). Therefore, the sufficient optical density cannot be obtained by them, and thus, in the same manner as the comparison samples 1 and 3, it is not sufficient as the black matrix substrate.

Experimental Example 2

Nextly, under the same conditions as sample 1 of the present invention, the black pattern is formed on a glass substrate. By use of this black matrix substrate, a color filter is produced in the following procedure.

Namely, ink compositions S-1, S-2 and S-3 as listed below, are printed between the black matrix on the black matrix substrate in this order by an engraving offset printing by use of a plate, which has an engraved portion in a stripe shape having a plate depth of 6 μm and a width of 110 μm, and a silicon blanket, so that stripe patterns of blue, green and red are formed by printing respectively, each of which has a width of 110 μm. After that, by heating the above mentioned substrate at a temperature of about 200° C. for about 30 minutes, thermo-setting of the ink compositions are performed, so that the colored layer having a film thickness of about 2 to 3 μm, is obtained.

composition of varnish polyesteracrylate resin (Alonix M-7100, made by Toagosei chemical Industry Co., Ltd.) . . . 70 wt. parts diallyl phthalate prepolymer . . . 30 wt. parts composition of ink composition S-1 varnish . . . 100 wt. parts pigment (Lionol blue ES)

(C.I.Pigment Blue 15:6, made by Toyo Ink Manufacturing Co.) 15.5 wt. parts pigment (Lionogen violet RL)

(C.I.Pigment Violet 23, made by Toyo ink Manufacturing Co.) . . . 4 wt. parts composition of ink composition S-2 varnish . . . 100 wt. parts pigment (Lionol green 2YS)

(C.I.Pigment Green 36, made by Toyo ink Manufacturing Co.) 22 wt. parts pigment (Seika fast yellow 2700)

(C.I.Pigment Yellow 83, made by Dainichiseika Kogyo K.K.) . . . 7.5 wt. parts composition ink composition S-3 varnish . . . 100 wt. parts pigment (Chromophthal red A3B)

(C.I.Pigment Red 177, by Chiba-Gaigy Ltd.) . . . 32 wt. parts pigment (Seika fast yellow 2700)

(C.I.Pigment Yellow 83, made by Dainichiseika kogyo K.K.) . . . 8 wt. parts

Nextly, the protection layer and the transparent layer are formed as aforementioned, so that the color filter is obtained.

Namely, the protection layer (film thickness=2.0 μm) is formed on the above mentioned colored layer by coating the coating solution listed below, by use of spinner coating method (rotation speed=1500 r.p.m.).

(composition of the coating solution to form the protection layer)

photo-hardening type acrylate oligomer (o-cresol novolak epoxiacrylate (molecular weight 1500 to 2000)) . . . 35 wt. parts cresol novolak type epoxy resin 15 wt. parts mulfunctional polymericmonomer (dipentaerythitol hexaacrylate (DPHA made by Nippon Kayaku Co. Ltd.)) 50 wt. parts polymerization initiating agent (Irgacure, made by Chiba-Gaigy Ltd.) . . . 2 wt. parts epoxy hardening agent (UVE 1014, made by General Electric Co.) 2 wt. parts 2-methoxyetanol acetate . . . 200 wt. parts With respect to this coating film, a light exposure for the whole surface, with a light exposure amount of 150 mJ/cm$^2$, is performed by use of a proximity exposing device made by Dainihon screen Co.. After that, the substrate is soaked in 1, 1, 2, 2-tetrachloroethane at room temperature for 1 minute, so that only the uncured portion of the coating film is removed, and the protection film is formed.

Further, on this protection film, an indium tin oxide (ITO) film is formed to be a transparent electrode, which has a thickness of 0.4 μm, by means of the sputtering method, so that the color filter is obtained.

LCD panels are produced by use of the color filter constructed as mentioned above, and by use of a TFT substrate formed by a conventional known method.

Here, amorphous silicon is used for a semiconductor layer of this TFT substrate, and the polarization plates of the LCD are attached such that it becomes the normally white type.

In order to evaluate the characteristics of those LCDs, the relationship between the gate voltage and the transmittance of each of the LCDs is measured.

As a result, it is recognized that the gate OFF voltage can be decreased by 2 volts, in case of the LCD which uses the color filter of the present invention, in comparison with the case of the LCD which uses the conventional color filter using Cr as the black matrix layer.

The reason for the above recognized fact, is estimated to be that, on one hand, in case of using the conventional color filter, a portion of the back light of the LCD is reflected by the black matrix layer surface to be an incident light to the TFT and become the cause of generating a photo-electric current of the TFT, since the reflectance of the black matrix layer of the color filter is high, and, on the other hand, in case of using the color filter with the black matrix substrate of the present invention, the light emission amount to the TFT is reduced, since the reflectance of the black matrix layer surface is low, resulting in that the photo-electric current is reduced and the gate OFF voltage is improved.

According to this result, the effect is confirmed in the LCD using the color filter with the black matrix substrate of the present invention, that the driving voltage of the LCD can be reduced, and thus the power consumption can be reduced. This is a very good effect to make the continuous using time long, in case of driving a drycell battery.

In order to evaluate another effect of the color filter of the present invention, the contrast ratio of the LCD is measured.

In the contrast ratio measurement at a bright environment, a contrast ratio which is 2.4 times of the conventional color filter, can be obtained by using color filter of the present invention.

The reason for this is estimated to be that the influence of the external light is reduced because the reflectance of the black matrix layer of the color filter is lowered.

In the contrast ratio measurement in a dark environment, a contrast ratio which is 1.6 times the conventional color filter, can be obtained by using the color filter of the present invention.

The reason for this is estimated to be that the photoelectric current of the TFT is reduced as aforementioned, resulting in improvement of the leaking light at the time of displaying black.

As mentioned above, it can be recognized that the color filter of the present invention has the effect to reduce the power consumption of the LCD and improve the contrast ratio.

Experimental Example 3

As the transparent substrate, the 7059 glass made by Corning Co. (thickness=1.1 mm) is used, and the photo-sensitive resist, which composition is listed below is coated on the transparent substrate, by the spinner coating method (rotation speed—1500 r.p.m.). After that, it is dried under the condition that the temperature is 70° C. and the drying time is 10 minutes, so that the photo-sensitive resist layer (thickness=0.6 μm) is formed.

(composition of the photo-sensitive resist)

polyvinyl alcohol 4.47% aqueous solution (Gohsenal T-330, made by Nippon Synthetic Chemical Industry Co.,Ltd.) . . . 1000 wt. parts diazo resin 5% aqueous solution (D-011, made by Shinko Giken Co.) . . . 57 wt. parts With respect to this photo-sensitive resist layer, the light exposure is performed through a photomask (line width =20 μm) for the black matrix. A super high pressure mercury lamp 2 kW, is used as the light source for the light exposure, and the light is irradiated for 10 minutes. After that, a spray development by use of water at room temperature is performed, and air drying is performed, so that a relief image having a line width of 20 μm, for the black matrix, is formed.

Nextly, with respect to this transparent substrate, the heat treatment process is applied by use of each temperature of 70°, 90°, 120°, 150°, 170°, 190° C., respectively, for 30 minutes. After that, the transparent substrate is soaked in the palladium chloride aqueous solution (Red Sumer, made by Kanigen Co.) for 30 minutes. Then, water washing and dewatering processes are applied to it, so that a relief including catalyst is obtained from the above mentioned relief image. The film thickness of the relief portion of the transparent substrate is 0.5 μm for all of the cases.

After that, the transparent substrate is soaked in nickel plating solution including dimethyl amine borane as reducing agent (nickel plating solution Top Chemi Alloy B-1, made by Okuno Chemical Industries Co.,Ltd.) for 4 minutes. Then, water washing and dewatering processes are applied to it, so that the black relief (black matrix) is formed (samples 1 to 6, respectively).

Nextly, with respect to each of those samples 1 to 6 produced as mentioned above, the X ray scattering intensity of the polyvinyl alcohol in the relief including catalyst before applying the electroless plating, and the optical density of the black matrix after applying the electroless plating process, are measured under the condition listed-below.

The results of the measurements, are shown in Table 2.

X ray scattering intensity measurement measuring method: X ray diffraction method device: RADII - C (made by Rigaku Co.)

specification: attachment . . . thin film attachment, scanning axis . . . 2Θ, X ray incident angle . . . 0.5°, counting method . . . continuous counting, sampling angle . . . 0.02° scanning speed . . . 1.0°/min, accumulated numbers . . . 3 times, target . . . Cu, lamp voltage . . . 60 kV, lamp current . . . 300 mA, slit . . . DS 0.20 mm $RS_M$ 0.80 mm, monochromater . . . used, counter . . . SC optical density measurement measuring method: spectroscopic transmittance measurement (wave length: 400 to 700 nm)

device : microscope spectroscopic transmittance light measuring device (AH2 - STK, made by Olympus Kogaku Koryo Co.)

specification: spectroscopic wave length . . . 400 to 700 nm, wave length resolution . . . 5.0 nm As shown in Table 2, the samples 1 to 3, which X ray scattering intensity values of the polyvinyl alcohol in the relief including catalyst, are within a range of 200 to 580 cps/μm, have high optical densities i.e. approximately not less than 3. However, the samples 4 to 6, which X ray scattering intensity values are out of this range, do not have sufficient optical densities. Here, the unit "cps/μm" means the X ray scattering intensity per unit film thickness of the relief image portion.

As a whole, there is a tendency that, as the temperature of the heat process increases, the scattering intensity value increases, and at the same time, the X ray diffraction peak angle is shifted to the higher angle side, and the width of half value thereof decreases. Namely, although it is a view of qualitative analysis, it is suggested that, as the temperature of the heat process increases, the regulation of the lattice formed by the polymer chain of the polyvinyl alcohol in the relief image becomes shorter cycle, the degree of crystallization increases, and the dispersion rate of the orientation decreases.

As explained above in detail, a black matrix substrate can be provided by the present embodiment, which has a high dimensional accuracy, a high light-shielding property, and a low reflectance, and which is suitable to form a color filter used for a color sensor, a flat display device such as a liquid crystal display device, and an imager such as a CCD (Charge Coupled Device). Further, a color filter having a high contrast ratio, and a liquid crystal display device having a good image quality, can also be provided by the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

TABLE 1

| SAMPLE | OPTICAL DENSITY | REFLECTION COEFFICIENT (%) OBSERVER SIDE | REFLECTION COEFFICIENT (%) FILM SURFACE | NICKEL PARTICLE AVERAGE PARTICLE DIAMETER (nm) | 5–50 nm RANGE (%) | 10–30 nm RANGE (%) | 10–20 nm RANGE (%) | PHOTOGRAPHING DENSITY OF PARTICLE (%) |
|---|---|---|---|---|---|---|---|---|
| PRESENT INVENTION SAMPLE 1 | ≧3 | 7.78 | 5.34 | 13.9 | 100 | 100 | 100 | 83.9 |
| PRESENT INVENTION SAMPLE 2 | ≧3 | 10.04 | 15.43 | 18.4 | 100 | 100 | 63 | 85.4 |
| PRESENT INVENTION SAMPLE 3 | ≧3 | 9.80 | 24.30 | 21.7 | 92 | 85 | 40 | 89.5 |
| PRESENT INVENTION SAMPLE 4 | 1.83 | 4.89 | 5.15 | 15.2 | 100 | 100 | 82 | 62.1 |
| PRESENT INVENTION SAMPLE 5 | ≧3 | 9.81 | 42.29 | 33.9 | 86 | 40 | 4 | 80.5 |
| COMPARISON SAMPLE 1 | 0.37 | 3.12 | 6.63 | 6.7 | 79 | 0 | 0 | 20.0 |
| COMPARISON SAMPLE 2 | 1.00 | 2.45 | 5.47 | 9.3 | 96 | 42 | 42 | 57.3 |
| COMPARISON SAMPLE 3 | 0.31 | 1.97 | 5.59 | 8.0 | 77 | 34 | 34 | 19.8 |
| COMPARISON SAMPLE 4 | 1.20 | 3.17 | 5.21 | 14.1 | 100 | 100 | 100 | 54.0 |

TABLE 2

| SAMPLE | TEMPERATURE OF HEAT TREATMENT(°C.) | OPTICAL DENSITY | SCATTERING ANGLE (2θ) | SCATTERING STRENGTH (cps/μm) | HALF VALUE WIDTH (°) |
|---|---|---|---|---|---|
| No. 1 | 70 | 3.3 | 19.25 | 226 | 4.07 |
| No. 2 | 90 | 3.4 | 19.27 | 262 | 3.67 |
| No. 3 | 120 | 2.9 | 19.39 | 576 | 1.94 |
| No. 4 | 150 | 1.2 | 19.56 | 592 | 1.91 |
| No. 5 | 170 | 0.0 | 19.52 | 976 | 1.54 |
| No. 6 | 190 | 0.0 | 19.56 | 922 | 1.54 |

What is claimed is:

1. A color filter comprising:

a black matrix substrate comprising a substrate and a black pattern formed on said substrate, said black pattern comprising resin and metal particles, wherein (i) said metal particles have such a particle diameter distribution that particles having particle diameters in a range of 10 nm to 20 nm are not less than 40% of the total particles, in a range of 10 nm to 30 nm are not less than 80% of the total particles, and in a range of 5 nm to 50 nm are not less than 90% of the total particles, (ii) a projected area density at a conversion of 600Å thickness of said metal particles in said black pattern is not less than 60%, and (iii) an optical density of said black matrix substrate is no less than 1.5;

a colored layer comprising a plurality of color patterns formed between portions of said black pattern on said black matrix substrate; and a transparent electrode formed on said colored layer.

2. The color filter of claim 1, wherein said metal particles comprise at least one element selected from the group consisting of Ni, Co, Fe, Cr, Cu, Pd, Au, Pt, Sn, and Zn.

3. The color filter of claim 1, wherein said resin comprises a catalytic component to form said black pattern by electroless plating.

4. The color filter according to claim 3, wherein said catalytic component is present in an amount of 0.01–5 wt %, and comprises a metal compound.

5. The color filter according to claim 1, wherein said resin comprises a catalytic component for electroless plating, and said metal particles are precipitated in said black pattern via a reducing agent which reduces said catalytic component and metal ions in the electroless plating solution used in the electroless plating.

6. The color filter of claim 5, wherein said reducing agent comprises one of a boron compound and a phosphoric compound.

7. The color filter of claim 1, wherein said resin comprises polyvinyl alcohol, the x-ray scattering intensity value of which is 200 to 580 cps/μm before forming said black pattern.

8. A liquid crystal display device comprising:

a color filter comprising (a) a black matrix substrate comprising a first substrate, and a black pattern formed on said first substrate, said black pattern comprising resin and metal particles, wherein (i) said metal particles have such a particle diameter distribution that particles having particle diameters in a range of 10 nm to 20 nm are not less than 40% of the total particles, in a range of 10 nm to 30 nm are not less than 80% of the total particles, and in a range of 5 nm to 50 nm are not less than 90% of the total particles, (ii) a projected area density at a conversion of 600Å thickness of said metal particles in said black pattern is not less than 60%, and (iii) an optical density of said black matrix substrate is no less than 1.5; (b) a colored layer comprising a plurality of color patterns formed between portions of said black pattern on said black matrix substrate; and (c) a transparent electrode formed on said colored layer;

an electrode substrate comprising a second substrate and an electrode formed on said second substrate, wherein said transparent electrode of said color filter and said electrode of said electrode substrate are opposed to each other; and a liquid crystal layer disposed between said transparent electrode of said color filter and said electrode of said electrode substrate.

9. The liquid crystal display device of claim 8, wherein said metal particles comprise at least one element selected from the group consisting of Ni, Co, Fe, Cr, Cu, Pd, Au, Pt, Sn, and Zn.

10. The liquid crystal display device of claim 8, wherein said resin comprises a catalytic component to form said black pattern by electroless plating.

11. The liquid crystal display device of claim 10, wherein said catalytic component is present in an amount of 0.01–5 wt %, and comprises a metal compound.

12. The liquid crystal display device of claim 8, wherein said resin comprises a catalytic component for electroless plating, and said metal particles are precipitated in said black pattern via a reducing agent which reduces said catalytic component and metal ions in the electroless plating solution used in the electroless plating.

13. The liquid crystal display device of claim 12, wherein said reducing agent comprises one of a boron compound and a phosphoric compound.

14. The liquid crystal display device of claim 8, wherein said resin comprises polyvinyl alcohol, the x-ray scattering intensity value of which is 200 to 580 cps/µm before forming said black pattern.

* * * * *